United States Patent [19]

Inoue

[11] Patent Number: 4,645,048
[45] Date of Patent: Feb. 24, 1987

[54] DRIVE MECHANISM FOR MACHINES

[75] Inventor: Kiyoshi Inoue, Tokyo, Japan

[73] Assignee: Inoue Japax Research Incorporated, Kanagawaken, Japan

[21] Appl. No.: 505,225

[22] Filed: Jun. 17, 1983

[51] Int. Cl.$^4$ .............................................. F16D 43/20
[52] U.S. Cl. ................................ 192/0.034; 192/0.096; 192/0.098
[58] Field of Search .............. 192/0.032, 0.033, 0.034, 192/0.076, 0.096, 0.098

[56] References Cited

U.S. PATENT DOCUMENTS

| | | | |
|---|---|---|---|
| 3,385,986 | 5/1968 | Smith | 310/95 |
| 3,757,912 | 9/1973 | Ball, Jr. et al. | 192/0.034 |
| 3,915,271 | 10/1975 | Harper | 192/0.033 |
| 4,364,459 | 12/1982 | Futehally | 192/0.033 |
| 4,377,222 | 3/1983 | Sommer | 192/0.032 |
| 4,403,682 | 9/1983 | Norris et al. | 192/0.033 |
| 4,433,769 | 2/1984 | Scuccato et al. | 192/0.098 |
| 4,457,411 | 7/1984 | Hiramatsu | 192/0.076 |
| 4,466,526 | 8/1984 | Howlett et al. | 192/0.096 |
| 4,485,443 | 11/1984 | Knodler et al. | 192/0.033 |

FOREIGN PATENT DOCUMENTS

| | | | |
|---|---|---|---|
| 2818427 | 11/1979 | Fed. Rep. of Germany | 192/0.032 |
| 999919 | 7/1965 | United Kingdom . | |
| 2066919 | 7/1981 | United Kingdom | 192/0.033 |
| 2077949 | 12/1981 | United Kingdom . | |
| 667380 | 6/1979 | U.S.S.R. | 192/0.033 |
| 874402 | 10/1981 | U.S.S.R. | 192/0.032 |

*Primary Examiner*—Rodney H. Bonck
*Assistant Examiner*—Alan G. Towner
*Attorney, Agent, or Firm*—Karl F. Ross; Herbert Dubno

[57] ABSTRACT

A drive mechanism for a machine such as a machine tool or robot includes a rotatable shaft, e.g. a lead screw or spindle, drivingly connected with a movable element, e.g. a worktable or tool support, in the machine, a drive shaft for rotation by a motor and a coupling unit, e.g. clutch or gear transmission, for drivingly connecting the drive shaft with the rotatable shaft to move the movable element in a predetermined form of movement under a variable load in the machine. Encoders are provided in a rotation-sensing relationship with the drive shaft and the rotatable shaft, respectively, to feed two trains of rotation-responsive pulses into a differential counter which provides a difference in angle of rotation signal representing an instantaneous torque produced at the drive coupling unit between the drive and rotatable shafts. The differential signal and a preset signal set in a setting circuit, representing a predetermined value of torque are processed in an output circuit which produces a control signal which is used to control the motor or the coupling unit so as to maintain the torque between the drive and rotatable shafts substantially at the reference value.

8 Claims, 2 Drawing Figures

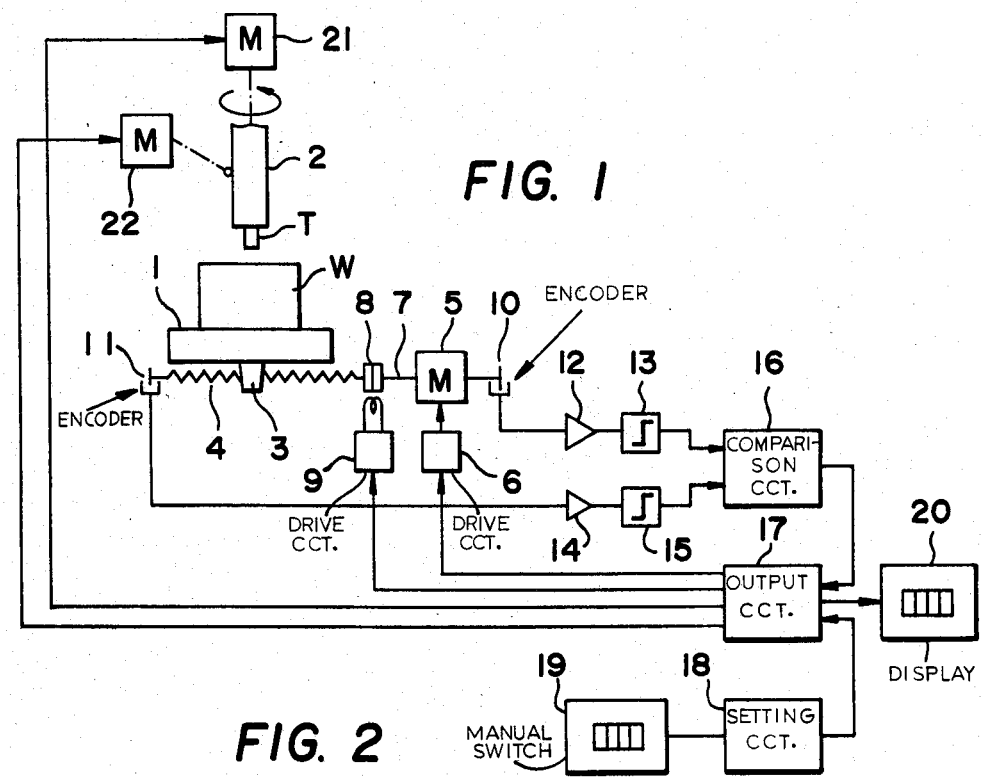
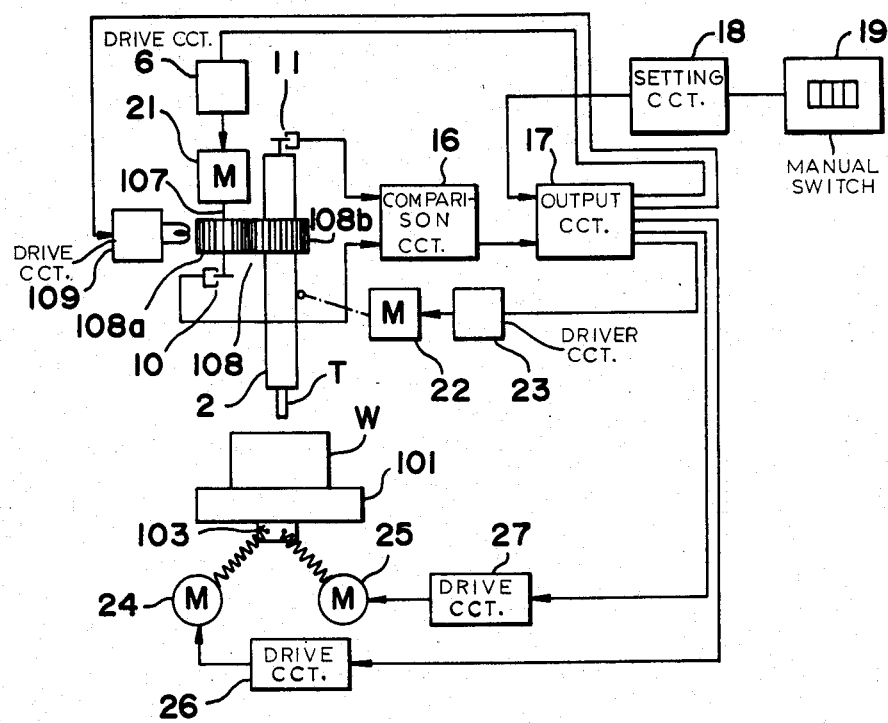

DRIVE MECHANISM FOR MACHINES

FIELD OF THE INVENTION

The present invention relates to a drive mechanism for use in a machine, e.g. machine tool such as a milling, grinding or boring machine, industrial machine or robot and, more particularly, to a new and improved drive mechanism for moving an element movable under varying loads therein.

BACKGROUND OF THE INVENTION

A drive mechanism for effecting a movement of a movable element in a machine commonly makes use of a rotatable shaft drivingly connected with the movable element, a drive shaft rotated by a motor and a coupling such as a clutch or gear transmission for drivingly connecting the drive shaft with the rotatable shaft. A precision movement of the movable element is commonly effected in response to a corresponding command drive signal applied to the motor. Movable elements, such as a worktable or tool, in machines often are, however, massive and/or heavy, and impose considerable load on the rotatable shaft. In the operation of a machine, such a movable element normally must encounter varying loads, e.g. machining loads.

Due to these varying loads, it has been recognized that a drive transmission from the motor to the movable element tends to become irregular so that a precision command signal is not necessarily reproduced precisely in a desired movement of the movable element. It is accordingly desirable that a varying load be ascertained within the drive mechanism during a course of operation of the machine.

OBJECTS OF THE INVENTION

Object of the present invention, therefore, are to provide a new and improved drive mechanism for a machine, which is capable of ascertaining a varying load on a movable element with high Precision during a movement of the element, to seek to provide a drive mechanism as described which provides an indication of such varying load in the form of a change in torque produced at the coupling between the drive and rotatable shafts, and also to seek to provide a mechanism as described having means for maintaining the torque substantially constant at a desired value against the changing load imposed on the movable element so that a highly accurate and smoothed drive transmission is assured between the motor and the movable element.

SUMMARY OF THE INVENTION

According to the present invention there is provided a drive mechanism for a machine, which mechanism comprises rotatable shaft means drivingly connected with a movable element in the machine; drive shaft means for rotation by motor means; coupling means for drivingly connecting the drive shaft means with the rotatable shaft means to move the movable element in a predetermined form of movement under a variable load in the machine; first sensing means responsive to the rotation of the drive shaft means to produce a first rotation sensing signal; second sensing means responsive to the rotation of the rotatable shaft means to produce a second rotation sensing signal; and comparison means responsive to the said first and second sensing signals to produce a comparison or differential signal representing a torque produced at the coupling means between the drive and rotatable shaft means while the element is moved in the said form of movement by the motor means.

The first and second sensing means each comprise an encoder. The two encoders are used to produce, as the first and second rotation sensing signals, respective trains of pulses in numbers which are proportional to the angles of rotations of the drive and rotatable shafts. Then, the comparator means may comprise a differential counter responsive to these trains to produce a deviation signal which represents the detected torque at the coupling means or between the drive and rotatable shafts. Advantageously, setting means is provided operable to input therein a preset signal representing a predetermined reference value of torque. Output means is provided responsive to the comparison signal and the preset signal to produce a control signal.

The output means may comprise control means operatively connected to the said motor for controlling the rotation of the said drive shaft means with the said output signal so as to maintain the detected torque at the coupling means substantially at the reference value.

Alternatively, the control means may be operatively connected to the coupling means for controlling connection of the drive and rotatable shaft means with a produced output signal so as to maintain the torque between these shaft means substantially at the reference value. The coupling may, for example, be an electromagnetically controllable clutch or gear transmission.

The movable element may also be movable by further motor means in a further form of movement exerting the variable load in the machine. The control means may then be operatively connected with the further motor means for controlling the movement of the element in the said further form with a produced output signal so as to maintain the torque at the coupling means substantially at the references value.

The machine may also include a further element movable by additional motor means in an additional form of movement in engagement with the first-mentioned movable element, exerting the variable load on the rotatable shaft means. The output means may then be operatively connected with the additional motor means for controlling the movement of the further element in the additional form with a produced output signal so as to maintain the torque at the coupling means substantially at the reference value.

BRIEF DESCRIPTION OF THE DRAWING

These and other features as well as advantages thereof will become more readily apparent from a reading of the following description when taken with reference to the accompanying drawing in which:

FIG. 1 is a schematic view diagrammatically illustrating a drive mechanism according the present invention; and FIG. 2 is a similar view illustrating another embodiment of the invention.

SPECIFIC DESCRIPTION

Referring now to FIG. 1 there is shown a drive mechanism for a machine tool which may be a milling or boring machines. The machine includes, as a movable element, a worktable 1 having a workpiece W securely mounted thereon and a tool T supported by a spindle 2 for rotation therewith.

The worktable 1 has a nut 3 secured thereto through which a lead screw 4 is threadedly passed to form a rotatable shaft for converting its rotary displacement into a corresponding linear displacement of the nut 3 and hence of the worktable 1. Of course, here the lead screw 4 is restrained by a conventional arrangement from its own axial movement.

A desired movement of the worktable 1 is effected by means of a motor 5 which is energized by its drive circuit 6 to rotate its output drive shaft 7 which is drivingly connected, via a clutch 8, with the lead screw 4. The clutch 8 is here an electromagnetic clutch energized by a drive circuit 9 to connect and disconnect the shafts 7 and 4.

In accordance with the principles of the invention, an encoder 10, 11 is provided in a rotation sensing relationship with each of the drive shaft 7 and the lead screw 4. The encoder 10, coupled with an amplifier 12 and a waveform-shaping Schmitt-trigger circuit 13 at its output, provides a first rotation-sensing signal in the form of a train of pulses representing an angle of rotation of the drive shaft 7. The encoder 11, likewise coupled with an amplifier 14 and a Schmitt-trigger circuit 15, provides a second rotation-sensing signal in the form of a train of pulses representing an angle of rotation of the lead screw 4. The two trains of pulses are applied to a comparison circuit 16 in the form of a differential counter which provides a comparison signal in the form of a deviation of counts of pulses between these trains, which signal is applied to an output or control circuit 17 through its first input terminal. It will be seen that the comparison signal represents a torque produced at the clutch 8 between the drive shaft 7 and the lead screw 4.

The output circuit 17 has its second input terminal for receiving from a setting circuit 18 a preset signal representing a predetermined reference value of the torque. The setting circuit 18 is operable by a manual switch 19 to preset the reference signal therein. The switch 19 may be a digital switch having a display for indicating the reference value of the torque.

The output circuit 17 responsive to the instantaneous value of torque produced at the clutch 8 may have associated therewith a display 20 representing that value in a numerical form. The display 20 associated with the output circuit 17 which is also responsive to the reference signal from the setting circuit 18 may be adapted to display a deviation of the instantaneous value of the torque from the reference value.

The output circuit 17 may also be constructed and arranged to control the motor 5 and/or the clutch 8 by producing an output or control signal. Thus, the control circuit 17 is shown as operatively connected to the drive circuit 6 for the motor to control the rotation of the motor 5 with the produced control signal so as to maintain the detected torque substantially at the reference value. The control circuit 17 may also or alternatively be connected operatively with the drive circuit 9 for the electromagnetic clutch 8 to control with the produced control signal the connection or disconnection, or the connection state thereat between the drive shaft and the lead screw so as to maintain the detected torque substantially at the reference value.

In the machine, during an operation thereof, the spindle 2 for rotation and axial advance of the tool T may also be rotated and advanced. Thus, one or both of the rotary and axial-advance movements of the spindle may also be controlled so as to maintain the torque at the clutch 8 between the drive shaft 7 and the lead screw 4 substantially at the reference value. To such ends, the control circuit 17 is shown to be operatively connected to a motor 21 for rotating the spindle 2 and a motor 22 for axially advancing the spindle 2.

In the embodiment of FIG. 2, a gear transmission comprising a pair of gears 108a and 108b meshed with each other is used to drivingly couple the drive shaft 107 of a motor 21, which is secured to the gear 108a, with the spindle 2, which is secured to the gear 108b, to rotate the spindle 2. The coupling of the gears 108a and 108b is shown to be controlled by a drive circuit 109. The motor 21 is shown to be energized by a drive circuit 6. In addition, a motor 22 is shown energizable by its driver circuit 23 for advancing the spindle 2. A tool T is here again securely supported by the spindle 2 to rotate and to be advanced into a workpiece W which is here again securely mounted on a worktable 101. The worktable 101 is driven by a pair of motors 24 and 25 energizable by their respective drive circuits 26 and 27 for displacing the workpiece W in a horizontal or X-Y plane with the rotating and advancing tool T.

An encoder 10, 11 is provided in a rotation-sensing relationship with each of the drive shaft 107 and the spindle 2. As described in connection with FIG. 1, the comparison circuit 16 compares the rotation-sensing signals fed from the encoders 10 and 12 to produce a comparison signal representing a torque produced, in this embodiment, at the gear transmission 108 between the drive shaft 107 and the spindle 2. Here again, the comparison signal is fed, together with a preset signal from the setting circuit 18, into the output circuit 17 which provides a control signal as previously described. The output of the control circuit 17 may be operatively connected to the driver circuit 6 for the motor 21 for controlling the rotation of the drive shaft 107, to the driver circuit 109 for the gear transmission 108 for controlling the connection between the gears 108a and 108b, to one or both of the driver circuits 26, 27 for the motors 24, 25 for controlling the displacement of the worktable 101, and/or to the driver circuit 23 for the motor 22 for controlling the axial advance movement of the spindle 2, so as to maintain the torque at the gear transmission 108 between the drive shaft 107 and the spindle 2 substantially constant at a reference value preset in the setting circuit 18 by the switch 19.

What is claimed is:

1. A drive mechanism for a machine, comprising:
rotatable shaft means drivingly connected with a movable element in the machine;
drive shaft means for rotation by motor means;
coupling means for drivingly connecting said drive shaft means with said rotatable shaft means to move said movable element in a predetermined form of movement under a variable load in the machine;
first sensing means responsive to the rotation of said drive shaft means to produce a first sensing signal;
second sensing means responsive to the rotation of said rotatable shaft means to produce a second sensing signal;
comparison means responsive to said first and second sensing signals to produce a comparison signal representing a torque produced at said coupling means between said drive and rotatable shaft means while said element is moved in said form of movement by said motor means; and
output means responsive to said comparison signal and to a reference signal representing a predetermined reference value of torque to produce an output signal, said output means comprising control means connected to an energization circuit for said motor for controlling the rotation of said drive shaft means thereby with said output signal so as to maintain said detected torque at said coupling means substantially at said reference value.

2. A drive mechanism for a machine, comprising:
rotatable shaft means drivingly connected with a movable element in the machine;
drive shaft means for rotation by motor means;
coupling means for drivingly connecting said drive shaft means with said rotatable shaft means to move said movable element in a predetermined form of movement under a variable load in the machine;
first sensing means responsive to the rotation of said drive shaft means to produce a first sensing signal;
second sensing means responsive to the rotation of said rotatable shaft means to produce a second sensing signal;
comparison means responsive to said first and second sensing signals to produce a comparison signal representing a torque produced at said coupling means between said drive and rotatable shaft means while said element is moved in said form of movement by said motor means; and
output means responsive to said comparison signal and to a reference signal representing a predetermined reference value of torque to produce an output signal, said output means comprising control means operatively connected with said coupling means for controlling the connection of said drive and rotatable shaft means with said output signal so as to maintain said detected torque between the shaft substantially at said reference value.

3. A drive mechanism as defined in claim 2 wherein said coupling means is an electromagnetic clutch having an energization circuit therefor responsive to said output signal.

4. A drive mechanism as defined in claim 2 wherein said coupling means comprises gear means having an energization circuit therefor responsive to said output signal.

5. A drive mechanism as defined in claim 2 wherein said movable element is also movable by further motor means in a further form of movement exerting said variable load in the machine, said output means comprising control means operatively connected to said further motor means for controlling the movement of said element in said further form so as to maintain said detected torque at said coupling means substantially at said reference value.

6. A drive mechanism for a machine, comprising:
rotatable shaft means drivingly connected with a movable element in the machine;
drive shaft means for rotation by motor means;
coupling means for drivingly connecting said drive shaft means with said rotatable shaft means to move said movable element in a predetermined form of movement under a variable load in the machine;
first sensing means responsive to the rotation of said drive shaft means to produce a first sensing signal;
second sensing means responsive to the rotation of said rotatable shaft means to produce a second sensing signal;
comparison means responsive to said first and second sensing signals to produce a comparison signal representing a torque produced at said coupling means between said drive and rotatable shaft means while said element is moved in said form of movement by said motor means; and
output means responsive to said comparison signal and to a reference signal representing a predetermined reference value of torque to produce an output signal, said machine including a further element movable by further motor means in a further mode of movement in engagement with said movable element, exerting said variable load on said rotatable shaft means, said output means comprising control means operatively connected to said further motor means for controlling the movement of said further element in said further form so as to maintain said detected torque at said coupling means substantially at said reference value.

7. A drive mechanism for a machine, comprising:
rotatable shaft means drivingly connected with a movable element in the machine;
drive shaft means for rotation by motor means;
coupling means for drivingly connecting said drive shaft means with said rotatable shaft means to move said movable element in a predetermined form of movement under a variable load in the machine;
first sensing means responsive to the rotation of said drive shaft means to produce a first sensing signal;
second sensing means responsive to the rotation of said rotatable shaft means to produce a second sensing signal; and
comparison means responsive to said first and second sensing signals to produce a comparison signal representing a torque produced at said coupling means between said drive and rotatable shaft means while said element is moved in said form of movement by said motor means, said first and second sensing means comprising first and second encoders, respectively, for producing said first and second sensing signals in the forms of respective trains of pulses and said comparison means comprising a differential counter responsive to said pulses in the respective trains for producing said comparison signal representing a difference in number of the pulses between said trains and representing said torque at said coupling means.

8. A drive mechanism for a machine, comprising:
rotatable shaft means drivingly connected with a movable element in the machine;
drive shaft means for rotation by motor means;
coupling means for drivingly connecting said drive shaft means with said rotatable shaft means to move said movable element in a predetermined form of movement under a variable load in the machine;
first sensing means responsive to the rotation of said drive shaft means to produce a first sensing signal;
second sensing means responsive to the rotation of said rotatable shaft means to produce a second sensing signal;
comparison means responsive to said first and second sensing signals to produce a comparison signal representing a torque produced at said coupling means between said drive and rotatable shaft means while said element is moved in said form of movement by said motor means; and
setting means operable to input therein a preset signal representing a predetermined reference value of torque and output means responsive to said comparison signal and said preset signal to produce a control signal for controlling said motor means and coupling means with said control signal.

* * * * *